UNITED STATES PATENT OFFICE 1,990,228

PROCESS FOR THE MANUFACTURE OF CARBON BLACK

Gustav Adolph Frenkel, Oakland, Calif., assignor to Shell Development Company, San Francisco, Calif., a corporation of Delaware No Drawing. Application October 24, 1932, Serial No. 639,306

4 Claims. (Cl. 134—60)

This invention relates particularly to carbon black produced by the thermal decomposition of hydrocarbon gases and is concerned with improving the carbon black so produced.

The usual method of preparing carbon black is by the incomplete combustion of hydrocarbon gas. The carbon black formed is deposited upon a metallic surface, from which the carbon black is periodically removed by scrapers or other means. It is also possible to produce a carbon black by passing methane-containing or other hydrocarbon gas through highly heated checker work or coke beds whereby the gas is substantially decomposed into hydrogen and carbon black. The carbon black can be removed from the hydrogen-containing gas by filter bags, by settling, by electrical precipitation or by passing the gas stream through a wash box.

By the thermal decomposition method a carbon black is obtained which is useful for some purposes but is as a rule inferior in quality to that obtained by the various gas burning processes.

It is an object of this invention to devise a process by which a carbon black of superior quality may be made from the carbon obtained by the thermal decomposition of hydrocarbon gas.

It is another object of this invention to produce a finely divided carbon black.

Another object of the invention is to remove moisture and benzol soluble substances from the carbon black.

A further object of the invention is to produce a new type of carbon black.

The further objects of the invention will be more fully and more clearly understood from the following description.

The carbon black produced by the thermal decomposition of hydrocarbon gas as above described is admixed with a volatile liquid, preferably distilled water although petroleum distillates, carbon tetrachloride or other solvents may also be used. It should be understood that by the term "combustion gas" I mean "gaseous products of combustion" or "flue gases."

The "slurry" produced is injected in a finely divided state and at high pressure into a highly heated gaseous medium, preferably a non-oxidizing gaseous medium as for example combustion gas, nitrogen, carbon monoxide, carbon dioxide, hydrogen, or mixtures of the same.

As a result of the contact of the injected material with the hot gas, flash evaporation of the liquid takes place at a lower pressure and the carbon black is broken up into very fine particles. The rapid evaporation also tends to remove any benzol soluble substances which may have been associated with the carbon black. Amounts of dry air or other dry gas may be added to the stream of carbon black and moist hot gas produced by the flash evaporation. By this addition of dry gas to the stream, subsequent to the flash evaporation, the humidity of the gas stream (carrying the finely divided carbon black in suspension) is reduced, facilitating the removal of the carbon black from the gas stream. The vapor produced by the flash evaporation can be condensed by suitable means and admixed with further amounts of carbon and used again in the system.

In my process it is not desirable to use a volatile liquid containing dissolved solids as upon flash evaporation the dissolved solids will contaminate the carbon black tending to produce a carbon black of high ash content. For this reason I do not recommend the use of undistilled water in my process. However, if a small increase in the percentage of ash in the product is of no consequence, it will be apparent that water containing small amounts of dissolved solids can be used.

The carbon black produced by my process is quite different in physical and chemical properties from the carbon black produced by the thermal decomposition of hydrocarbon gas.

Generally the smaller the size of particles of a carbon black, the better is the carbon black suitable for increasing the tensile strength of rubber. Carbon black made by the incomplete combustion of natural gas has a particle size of about 0.15 microns and is particularly suited for increasing the tensile strength of rubber and because of this property is often called "hard" carbon.

Carbon black made by the thermal decomposition of hydrocarbon gas has a particle size of about 1.0 micron and is far less effective than carbon black made by the incomplete combustion in increasing the tensile strength of rubber. Such carbon black which will not increase the tensile strength of rubber in a measure comparable to "hard" carbon black is called "soft" carbon black.

By my process it is possible to so reduce the size of the particles of a "soft" carbon black and improve its objectionable characteristics that it simulates a "hard" carbon black.

One of the chief advantages of my process is that a commercial carbon black can be produced by the thermal decomposition of natural gas thereby rendering it no longer necessary to manufacture the majority of carbon black by the wasteful method of burning the natural gas as is now the universal practice.

I claim as my invention:

1. A process for the manufacture of carbon black of great uniformity and fineness from the carbon black obtained by thermal decomposition of hydrocarbons, which comprises admixing said carbon black with water, injecting the resulting mixture into a highly heated gaseous medium under a pressure and at a temperature whereat steam is substantially instantaneously generated and the carbon black broken up thereby into very fine particles having a particle size substantially less than 1.0 micron, and thereafter collecting said fine particles of carbon black.

2. A process for the manufacture of carbon black of great uniformity and fineness from the carbon black obtained by thermal decomposition of hydrocarbons, which comprises admixing said carbon black with water, injecting the resulting mixture into a stream of hot combustion gases under a pressure and at a temperature whereat steam is substantially instantaneously generated and the carbon black broken up thereby into very fine particles having a particle size substantially less than 1.0 micron, and thereafter collecting said fine particles of carbon black.

3. A process for the manufacture of carbon black of great uniformity and fineness from the carbon black obtained by thermal decomposition of hydrocarbons, which comprises admixing said carbon black with water, injecting the resulting mixture into a highly heated gaseous medium under a pressure and at a temperature whereat steam is substantially instantaneously generated and the carbon black broken up thereby into very fine particles having a particle size substantially less than 1.0 micron, reducing the humidity of the gas stream carrying the fine particles of carbon black by addition thereto of a dry gas, and thereafter collecting said fine particles of carbon black.

4. A process for the manufacture of carbon black of great uniformity and fineness from the carbon black obtained by thermal decomposition of hydrocarbons, which comprises admixing said carbon black with water, subjecting the resulting mixture to a superatmospheric pressure, injecting it into a highly heated gaseous medium at a lower pressure and at a temperature whereat steam is substantially instantaneously generated and the carbon black broken up thereby into very fine particles having a particle size substantially less than 1.0 micron, and thereafter collecting said fine particles of carbon black.

GUSTAV ADOLPH FRENKEL.